(12) United States Patent
Yamashita

(10) Patent No.: US 8,725,431 B2
(45) Date of Patent: May 13, 2014

(54) TACTILE SENSOR UNIT, ROBOT INCLUDING THE TACTILE SENSOR UNIT, AND LOAD CALCULATION METHOD

(75) Inventor: Kaoru Yamashita, Kyoto (JP)

(73) Assignee: National University Corporation Kyoto Institute of Technology, Kyoto-Shi (JP)

(*) Notice: Subject to any disclaimer, the term of this patent is extended or adjusted under 35 U.S.C. 154(b) by 347 days.

(21) Appl. No.: 13/201,318

(22) PCT Filed: Feb. 12, 2010

(86) PCT No.: PCT/JP2010/052100
§ 371 (c)(1),
(2), (4) Date: Aug. 12, 2011

(87) PCT Pub. No.: WO2010/095573
PCT Pub. Date: Aug. 26, 2010

(65) Prior Publication Data
US 2011/0301876 A1 Dec. 8, 2011

(30) Foreign Application Priority Data
Feb. 18, 2009 (JP) .................. 2009-035903

(51) Int. Cl.
*G01L 1/10* (2006.01)

(52) U.S. Cl.
USPC .......... 702/41; 901/33; 901/46; 73/774; 73/777; 73/862.381; 73/862.59; 700/258; 310/338

(58) Field of Classification Search
USPC .......... 702/41; 901/33, 46; 73/774, 777, 73/862.381, 862.59; 700/258; 310/338
See application file for complete search history.

(56) References Cited

U.S. PATENT DOCUMENTS

2007/0188285 A1* 8/2007 Shimoyama et al. ......... 336/192

FOREIGN PATENT DOCUMENTS

| EP | 1 365 221 | | 11/2003 |
| JP | 2006-078429 A | | 3/2006 |
| JP | 2006078429 A | * | 3/2006 |
| JP | 2006-201061 A | | 8/2006 |
| JP | 2009068988 A | * | 4/2009 |

OTHER PUBLICATIONS

Krishna et al., "Tactile Sensor Based on Piezoelectric Resonance" IEEE Sensors Journal, vol. 4, No. 5, Oct. 2004, pp. 691-697.*

(Continued)

*Primary Examiner* — Mohamed Charioui
*Assistant Examiner* — John Kuan
(74) *Attorney, Agent, or Firm* — Pearne & Gordon LLP

(57) ABSTRACT

A tactile sensor unit is provided, which includes a substrate; a coat formed on the substrate; and a cantilever beam structure having one end fixed to the substrate and curved to rise in such a direction that the other end of the cantilever beam structure is farther from the substrate than the one end. The tactile sensor unit detects a load applied to the coat. The cantilever beam structure is capable of resonating at a first resonant frequency and a second resonant frequency which is different from the first resonant frequency. The tactile sensor unit further includes a computation section for calculating a directional component of the load based on a change ratio of the first resonant frequency obtained in accordance with a change in the load and a change ratio of the second resonant frequency obtained in accordance with the change in the load.

5 Claims, 8 Drawing Sheets

(56) References Cited

OTHER PUBLICATIONS

Hashimoto et al., "MEMS on Robot Applications" Transducers 2009, Denver, CO, USA, Jun. 21-25, 2009, pp. 2176-2181.*

Dahiya et al., "Tactile Sensing—From Humans to Humanoids" IEEE Transactions on Robotics, vol. 26, No. 1, Feb. 2010, pp. 1-20; First published Nov. 20, 2009.*

Shinoda et al., "Tactile Sensing Based on Acoustic Resonance Tensor Cell" Transducers '97, 1997 International Conference on Solid-state Sensors and Actuators, Chicago, Jun. 16-19, 1997, pp. 129-132.*

Huang, YM, et al. Fabrication and Normal/Shear Stress Responses of Tactile Sensors of Polymer/Si Cantilevers Embedded in PDMS and Urethane Gel Elastomers. In: The Transactions of the Institute of Electrical Engineers of Japan, E, vol. 128, No. 5 (2008), pp. 193-197.

International Search Report for PCT/JP2010/052100; May 18, 2010.

* cited by examiner (a)

(b)

(a)

(b)

(a)

(b)

(a)

(b)

(a)

(b)

US 8,725,431 B2

TACTILE SENSOR UNIT, ROBOT INCLUDING THE TACTILE SENSOR UNIT, AND LOAD CALCULATION METHOD

TECHNICAL FIELD

The present invention relates to a tactile sensor unit for detecting an applied load, a robot including the tactile sensor unit, and a load calculation method.

BACKGROUND ART

As the society is aging, there is an increasing demand for a caring robot for providing a nursing care instead of a human. Such a caring robot is required to have a tactile sense which is not inferior to that of the human skin so that the robot does not injure any human. A sensor provided in hands of the robot needs to sense a slip as well as a pressure.

Conventionally, for a tactile sensor for sensing a load, a piezo resistance type element is used. For example, Patent Document 1 discloses a technology by which a cantilever beam structure fixed on a substrate is covered with a soft elastomer part and a load applied to the elastomer part is sensed based on how the cantilever beam structure is deformed. According to this technology, a piezo resistance type element provided at a base part of the cantilever beam structure measures the distortion of the base part to sense the load applied to the elastomer part.

However, with this technology, the piezo resistance type element merely senses a stress applied to the cantilever beam structure statically. Therefore, merely with one cantilever beam structure, the direction in which the load is applied cannot be sensed although the magnitude of the load can be sensed. Hence, Patent Document 1 and Non-patent Document 1 each propose a technology of combining a plurality of cantilever beam structures to sense loads applied in different directions.

FIG. 7(a) is a perspective view showing a structure of a cantilever type tactile sensor unit 101 disclosed in Non-patent Document 1. FIG. 7(b) is a cross-sectional view showing the structure of the cantilever type tactile sensor unit 101. As shown in FIG. 7(a), the cantilever type tactile sensor unit 101 includes four cantilever beam structures 102 formed on a substrate 104, and the four cantilever beam structures 102 are covered with an elastomer part 103. Among the four cantilever beam structures 102, each two cantilever beam structures 102 located at positions opposite to each other face each other. As shown in FIG. 7(b), the cantilever beam structures 102 each include an Si layer 102a and a polymer layer 102b, and are each formed by curving the Si layer 102a and the polymer layer 102b toward the polymer layer 102b side.

FIG. 8(a) is a cross-sectional view showing a state where a normal load is applied to the elastomer part 103. FIG. 8(b) is a cross-sectional view showing a state where a shear load is applied to the elastomer part 103. As shown in FIG. 8(a), when the normal load is applied to the elastomer part 103, the two cantilever beam structures 102 are both deformed in such a direction that the Si layer 102a approaches the substrate 104. By contrast, as shown in FIG. 8(b), when the rightward shear load is applied to the elastomer part 103, the left cantilever beam structure 102 is deformed in such a direction that the Si layer 102a approaches the substrate 104, whereas the right cantilever beam structure 102 is deformed in such a direction that the Si layer 102a is distanced away from the substrate 104. The cantilever beam structures 102 have a resistance changing in accordance with the deformation. Therefore, based on a change in the resistance of each cantilever beam structure 102 at the time of deformation, a normal directional component of the load applied to the elastomer part 103 and a shear directional component of the load applied to the elastomer part 103 can be sensed separately.

CITATION LIST

Patent Literature

Patent Document 1: Japanese Laid-Open Patent Publication No. 2006-201061 (laid-open on Aug. 3, 2006)

Non-Patent Literature

Non-patent Document 1: Yu Ming Huang et al., "Fabrication and Normal/Shear Stress Responses of Tactile Sensors of Polymer/Si Cantilevers Embedded in PDMS and Urethane Gel Elastomers", The Transactions of the Institute of Electrical Engineers of Japan, E, Vol. 128, No. 3 (2008) pp. 193-197

SUMMARY OF INVENTION

Technical Problem

In order to improve the sensitivity of a tactile sensor provided in a caring robot or the like, cantilever beam structures of the tactile sensor need to be provided at a high density. However, the conventional technologies as described above require a plurality of cantilever beam structures in order to sense a normal directional component of the load and a shear directional component of the load. This causes a problem that even where the tactile sensors are provided at a high density, it is difficult to improve the performance of the tactile sensor.

The present invention for solving the above-described problems has an object of providing a tactile sensor unit, the performance of which can be easily improved.

Solution to Problem

In order to solve the above-described problems, a tactile sensor unit according to the present invention includes a substrate; a coat formed on the substrate; and a cantilever beam structure having one end fixed to the substrate and curved to rise in such a direction that the other end of the cantilever beam structure is farther from the substrate than the one end. The tactile sensor unit detects a load applied to the coat. The cantilever beam structure is capable of resonating at a first resonant frequency and a second resonant frequency which is different from the first resonant frequency. The tactile sensor unit further includes a computation section for calculating a directional component of the load based on a change ratio of the first resonant frequency obtained in accordance with a change in the load and a change ratio of the second resonant frequency obtained in accordance with the change in the load.

According to the tactile sensor unit having the above-described constitution, unlike that of the conventional technologies, components of the load in a plurality of directions can be sensed separately with a single cantilever beam structure. This provides an effect of realizing a tactile sensor unit for easily sensing a slip as well as a pressure.

Also according to the tactile sensor unit having the above-described constitution, components of the load in a plurality of directions can be sensed separately with a single cantilever beam structure. Therefore, when the tactile sensor unit includes a plurality of cantilever beam structures at the same density as the conventional tactile sensor unit, the sensitivity of the tactile sensor unit can be improved as compared with that of the conventional tactile sensor unit. This makes it easier to provide the cantilever beam structures at a high density, and so provides an effect of realizing a tactile sensor unit, the performance of which can be improved easily. In addition, the number of the cantilever beam structures required to realize a tactile sensor unit having substantially the same level of sensitivity as the conventional tactile sensor unit can be reduced, and so the production cost can be reduced.

Preferably in the tactile sensor unit according to the present invention, the first resonant frequency is a frequency in a first resonance mode; the second resonant frequency is a frequency in a second resonance mode which is different from the first resonance mode; and the computation means includes voltage application means for applying AC voltages of a plurality of different frequencies to a piezoelectric layer included in the cantilever beam structure to resonate the cantilever beam structure in the first resonance mode and the second resonance mode; resonant frequency detection means for detecting the first resonant frequency and the second resonant frequency; and load calculation means for, where a load-free state is a state in which no load is applied to the coat, calculating a directional component of the load in a direction normal to the coat and another directional component of the load in a shear direction based on a first change ratio with respect to the load-free state, which is a change ratio of the first resonant frequency obtained in accordance with the change in the load, and also based on a second change ratio with respect to the load-free state, which is a change ratio of the second resonant frequency obtained in accordance with the change in the load.

According to the tactile sensor unit having the above-described constitution, the voltage application means applies AC voltages of a plurality of different frequencies to the piezoelectric layer, and the resonant frequency detection means detects the first resonant frequency of the cantilever beam structure in the first resonance mode and the second resonant frequency of the cantilever beam structure in the second resonance mode. As shown in expression (7) described later, a normal load and a shear load applied to the coat can be calculated based on the first change ratio with respect to the load-free state, which is a change ratio of the first resonant frequency, and also based on the second change ratio with respect to the load-free state, which is a change ratio of the second resonant frequency. Accordingly, the normal load and the shear load can be calculated by the load calculation means based on the resonant frequencies of one cantilever beam structure.

Preferably in the tactile sensor unit according to the present invention, the voltage application means applies an AC voltage of a still different frequency to the piezoelectric layer to further resonate the cantilever beam structure in a third resonance mode; the resonant frequency detection means further detects a third resonant frequency, which is a frequency in the third resonance mode, of the cantilever beam structure; and the load calculation means calculates a component of the load in the direction normal to the coat and components of the load in two shear directions based on a third change ratio with respect to the load-free state, which is a change ratio of the third resonant frequency obtained in accordance with the change in the load, the components of the load in the two shear directions being perpendicular to each other.

According to the tactile sensor unit having the above-described constitution, the cantilever beam structure is further resonated in the third resonance mode. The load calculation means calculates a component of the load in the direction normal to the coat and components of the load in two shear directions based on the third change ratio with respect to the load-free state, which is a change ratio of the third resonant frequency obtained in accordance with the change in the load. As a result, the load in a third axial direction can be distinguished, and so can be sensed.

Preferably in the tactile sensor unit according to the present invention, the cantilever beam structure is asymmetric with respect to each of the directions of the load; and the cantilever beam structure includes a plurality of electrodes insulated from each other.

According to the tactile sensor unit having the above-described constitution, the cantilever beam structure is asymmetric with respect to each of the directions of the load, and so the response is different in accordance with the direction of the load. Therefore, it can be distinguished whether the load in each of the directions is positive or negative, and the load in each of the directions can be sensed. In addition, the cantilever beam structure includes a plurality of electrodes insulated from each other. Therefore, a vibration of each direction can be excited efficiently.

A robot according to the present invention includes a tactile sensor unit as described above. The substrate, the coat and the cantilever beam structure are provided in a portion of the robot that is contactable with an object which is to contact the robot.

The robot having the above-described constitution can have a high level of sensitivity to a pressure and a slip.

In order to solve the above-described problems, a load calculation method according to the present invention is provided for calculating a load applied to a coat of a tactile sensor unit which includes a substrate, the coat formed on the substrate, and a cantilever beam structure. The cantilever beam structure has one end fixed to the substrate and is curved to rise in such a direction that the other end of the cantilever beam structure is farther from the substrate than the one end, and is capable of resonating at a first resonant frequency and a second resonant frequency which is different from the first resonant frequency. The calculation method includes a change ratio calculation step of calculating a change ratio of the first resonant frequency obtained in accordance with a change in the load and a change ratio of the second resonant frequency obtained in accordance with the change in the load; and a directional component calculation step of calculating a directional component of the load based on the change ratio of the first resonant frequency obtained in accordance with the change in the load and the change ratio of the second resonant frequency obtained in accordance with the change in the load.

The load calculation method having the above-described constitution provides substantially the same effect as that of the tactile sensor unit according to the present invention described above. Namely, unlike by the conventional technologies, components of the load in a plurality of directions can be sensed separately with a single cantilever beam structure. This provides an effect of realizing a load calculation method by which a slip as well as a pressure can be easily sensed.

Also according to the load calculation method having the above-described constitution, components of the load in a plurality of directions can be sensed separately with a single cantilever beam structure. Therefore, when the tactile sensor unit includes a plurality of cantilever beam structures at the same density as the conventional tactile sensor unit, the sensitivity of the tactile sensor unit can be improved as compared with that of the conventional tactile sensor unit.

Preferably in the load calculation method according to the present invention, the load calculation method further includes a step of dividing a calculation area into a plurality of quadrants in accordance with whether a normal load and a shear load, among the loads applied to the coat, are each positive or negative; and a correction step of correcting an error on each of the loads at a point, among points in each of the plurality of quadrants, at which an absolute value of the normal load and an absolute value of the shear load are both maximum.

According to the load calculation method having the above-described constitution, the calculation area is divided into a plurality of quadrants based on whether the normal load and the shear load, among the loads applied to the coat, are each positive or negative. The error on each of the loads at a point, among points of each of the plurality of quadrants, at which the absolute value of the normal load and the absolute value of the shear value are both maximum is corrected. As a result, the error calculated based on matrix A, which is not varied in accordance with the normal load or the shear load, can be corrected using data on the load at the corner point. In addition, the amount of data on the reference load to be referred to for the calculation can be reduced, and also the reliability of the result provided by the load calculation method can be improved.

DESCRIPTION OF EMBODIMENTS

An embodiment according to the present invention will be described with reference to FIG. 1 through FIG. 4.

<Tactile Sensor Unit>

Figure 1:
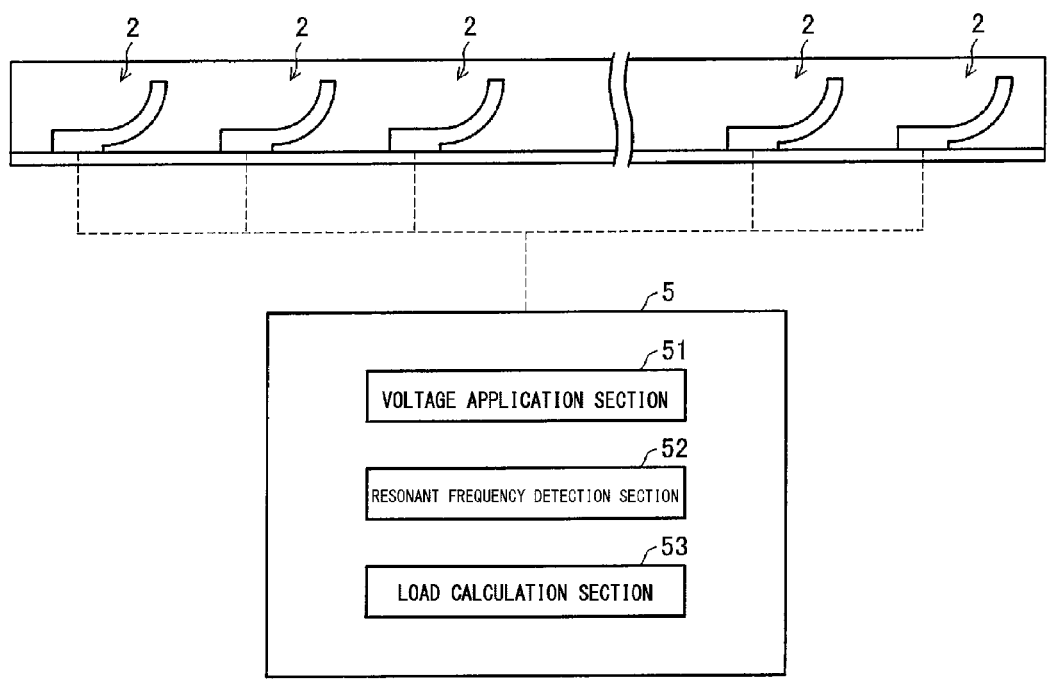
FIG. 1 is a block diagram showing a schematic structure of a tactile sensor unit in an embodiment according to the present invention.
Figure 2:
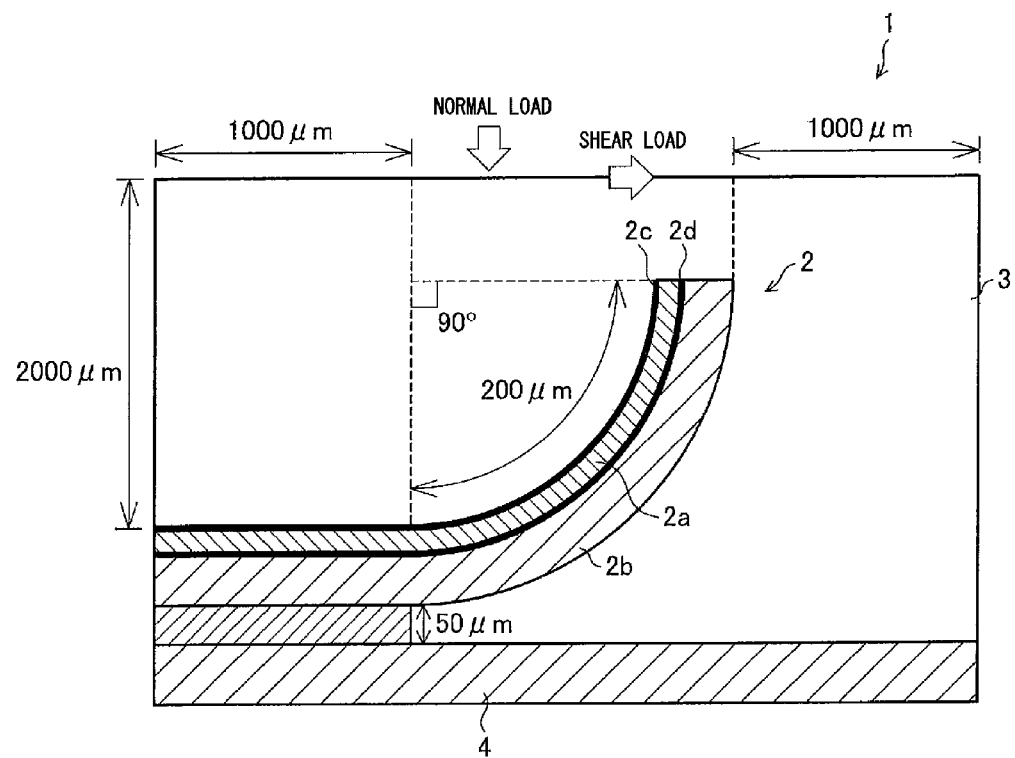
FIG. 2 is an enlarged partial cross-sectional view of the tactile sensor unit shown in FIG. 1.
Figure 3:
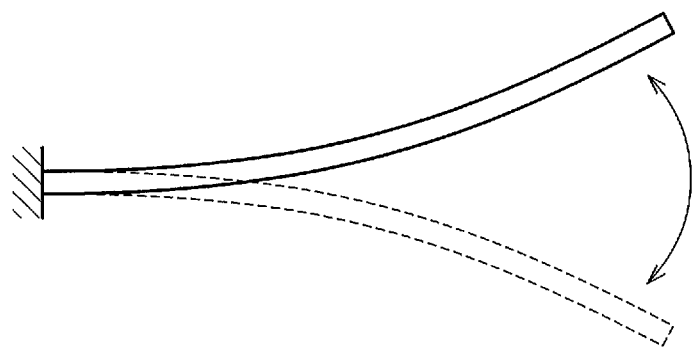
FIG. 3(a) shows a resonance state in a primary mode.
FIG. 3(b) shows a resonance state in a secondary mode.
Figure 3:
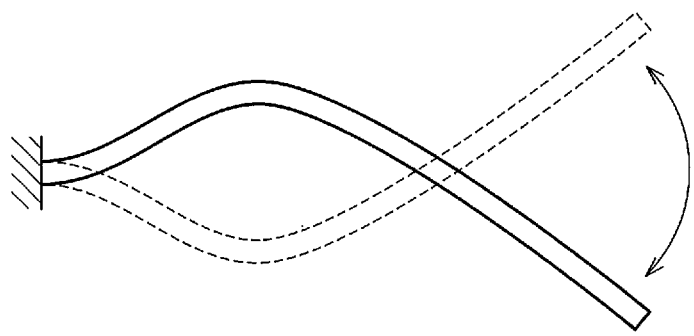
Figure 4:
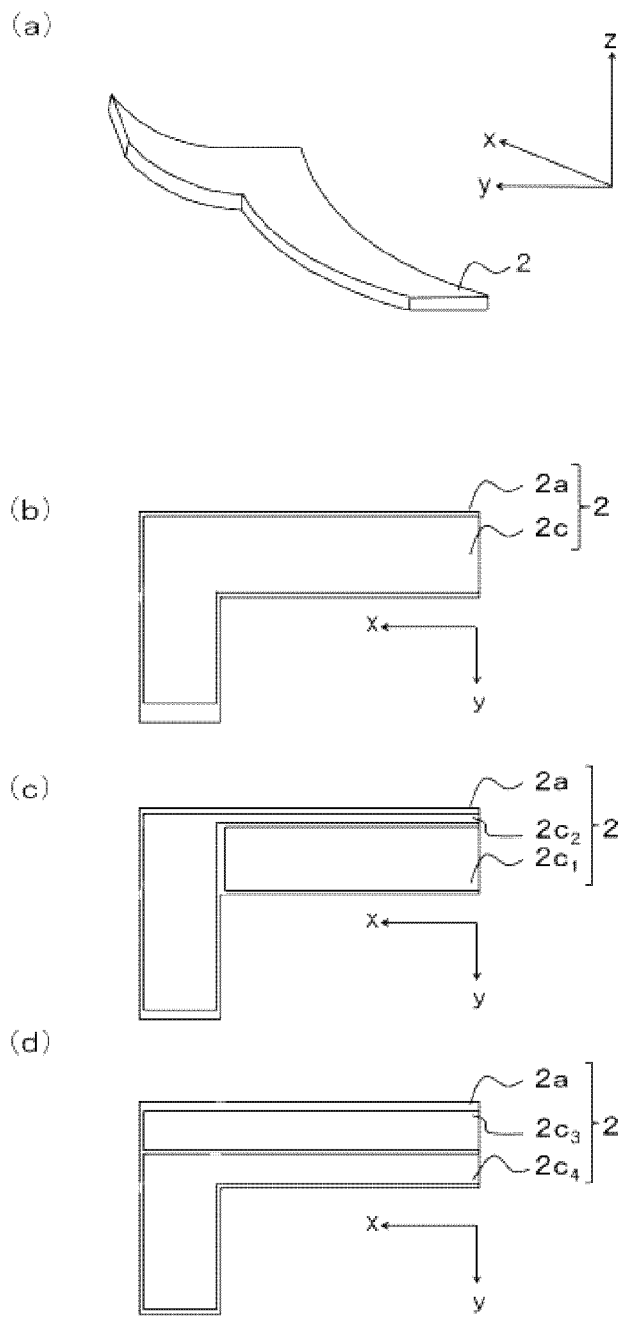
FIG. 4(a) shows a cantilever beam structure which is asymmetric with respect to an xy plane.
FIG. 4(b) shows a cantilever beam structure including a first electrode structure.
FIG. 4(c) shows a cantilever beam structure including a second electrode structure.
FIG. 4(d) shows a cantilever beam structure including a third electrode structure.

FIG. 1 is a block diagram showing a schematic structure of a tactile sensor unit 1 in this embodiment. FIG. 2 is an enlarged partial cross-sectional view of the tactile sensor unit 1. The tactile sensor unit 1 includes a plurality of cantilever beam structures 2, an elastomer part 3, a substrate 4, and a microcontroller 5. The substrate 4 is formed of silicon and is covered with the elastomer part 3. On the substrate 4, the plurality of cantilever beam structures 2 are provided. Each cantilever beam structure 2 has one end fixed to the substrate 4 and is curved to rise in such a direction that the other end of the cantilever beam structure 2 is farther from the substrate 4 than the one end. The microcontroller 5 is connected to each cantilever beam structure 2, and includes a voltage application section 51, a resonant frequency detection section 52, and a load calculation section 53. The microcontroller 5 acts as a computation section of the present invention.

Each cantilever beam structure 2 includes a PZT layer 2a, an $SiO_2$ layer 2b, an Au layer 2c, and a Pt/Ti layer 2d. The PZT layer 2a is a piezoelectric element and is formed between the Au layer 2c and the Pt/Ti layer 2d. The Au layer 2c and the Pt/Ti layer 2d each act as an electrode for applying an AC voltage to the PZT layer 2a. The $SiO_2$ layer 2b is formed between the Pt/Ti layer 2d and the substrate 4, and insulates the substrate 4 from the Pt/Ti layer 2d.

In this embodiment, the PZT layer 2a, the $SiO_2$ layer 2b and the Au layer 2c respectively have thicknesses of 1 μm, 3 μm and 50 nm. In the Pt/Ti layer 2d, the Pt layer has a thickness of 200 nm, and the Ti layer has a thickness of 20 nm.

By applying an AC voltage of a predetermined frequency to the PZT layer 2a by the Au layer 2c and the Pt/Ti layer 2d, the cantilever beam structure 2 is resonated. The frequency of the AC voltage applied to the PZT layer 2a is controlled by the voltage application section 51 shown in FIG. 1.

The resonance mode of the cantilever beam structure 2 is determined by the frequency of the applied AC voltage. For example, when the PZT layer 2a is supplied with an AC voltage of 5 V, 60 kHz, the PZT layer 2a resonates in a primary mode. As shown in FIG. 3(a), when a resonator body resonates in the primary mode, the entirety thereof vibrates in the same direction.

When the PZT layer 2a is supplied with an AC voltage of 5 V, 300 kHz, the PZT layer 2a resonates in a secondary mode. As shown in FIG. 3(b), when a resonator body resonates in the secondary mode, the vibration direction of a part of the resonator body is different from the vibration direction of the remaining part of the resonator body.

FIG. 4(a) shows a cantilever beam structure which is asymmetric with respect to an xy plane. FIG. 4(b) shows a cantilever beam structure having a first electrode structure. FIG. 4(c) shows a cantilever beam structure having a second electrode structure. FIG. 4(d) shows a cantilever beam structure having a third electrode structure.

In FIG. 4(a), the cantilever beam structure 2 is asymmetric with respect to the xy plane, and a portion thereof projecting in a third axial direction (y axial direction) is curved to rise upward (z axial direction). As a result, a difference is caused to a tertiary mode resonance state based on a load applied in the third axial direction (y axial direction). Accordingly, the load in the third axial direction can be distinguished, and so can be sensed. Thus, the load in the third axial direction (y axial direction) can be detected efficiently. In addition, the cantilever beam structure 2 is also curved to rise upward in the z axial direction along the x axial direction. As a result, the load applied in the x axial direction and the load applied in the y axial direction can be distinguished from each other, and so can be sensed. As described above, the cantilever beam structure 2 shown in FIG. 4(a) is asymmetric with respect to the directions in which the load is applied (x axial direction, y axial direction, and z axial direction), and so the loads in these three directions can be sensed.

In FIG. 4(b), the cantilever beam structure 2 has the first electrode structure. In the first electrode structure, the Au layer 2c itself is not electrically separated. In FIG. 4(c), the cantilever beam structure 2 has the second electrode structure. In the second electrode structure, the Au layer 2c itself is electrically separated from a first electrode area $2c_1$ and from a second electrode area $2c_2$. The first electrode area $2c_1$ extends in the x axial direction. The second electrode area $2c_2$ includes a main portion extending in the y axial direction and a sub portion extending in the x axial direction. By applying an electric field to each of the first electrode area $2c_1$ and the second electrode area $2c_2$ separately, a vibration in each of the x axial direction and the y axial direction can be independently obtained. In FIG. 4(d), the cantilever beam structure 2 has the third electrode structure. In the third electrode structure, the Au layer 2c itself is electrically separated from a third electrode area $2c_3$ and from a fourth electrode area $2c_4$. The third electrode area $2c_3$ extends in the x axial direction. The fourth electrode area $2c_4$ includes a portion extending in the x axial direction and a portion extending in the y axial direction (portion projecting in the y axial direction). With the cantilever beam structure 2 having the third electrode structure, by applying an electric field of the same phase to the third electrode area $2c_3$ and the fourth electrode area $2c_4$, a vibration can be excited in the xz plane. By applying electric fields of the opposite phases to the third electrode area $2c_3$ and the fourth electrode area $2c_4$, a twisted vibration around the x axis can be excited and the portion projecting in the y axial direction can be vibrated in the yz plane. Accordingly, the vibration in each direction can be excited efficiently.

In this embodiment, the PZT layer (sol-gel film) is used as a piezoelectric layer acting as a part of the cantilever beam structure 2. Alternatively, other types of piezoelectric elements are usable. The Au layer and the Pt/Ti layer are used as electrode layers as a part of the cantilever beam structure 2, but the materials of the electrode layers may be any other materials as long as a voltage can be applied to the piezoelectric layer.

In the above, the tactile sensor unit according to the present invention has been described. A tactile sensor unit according to the present invention includes a substrate; a coat formed on the substrate; and a cantilever beam structure having one end fixed to the substrate and curved to rise in such a direction that the other end of the cantilever beam structure is farther from the substrate than the one end. The tactile sensor unit detects a load applied to the coat. The cantilever beam structure is capable of resonating at a first resonant frequency and a second resonant frequency which is different from the first resonant frequency. The tactile sensor unit further includes a computation section for calculating a directional component of the load based on a change ratio of the first resonant frequency obtained in accordance with a change in the load and a change ratio of the second resonant frequency obtained in accordance with the change in the load.

The conventional technologies require two cantilever beam structures to sense a normal load and a shear load. In the embodiment according to the present invention, unlike by the conventional technologies, components of the load in a plurality of directions can be sensed separately with a single cantilever beam structure. This provides an effect of realizing a tactile sensor unit which easily senses a slip as well as a pressure. According to this embodiment, components of the load in a plurality of directions (the normal directional component and the shear directional component of the load) can be sensed separately with a single cantilever beam structure. Therefore, when the tactile sensor unit includes a plurality of cantilever beam structures at the same density as the conventional tactile sensor unit, the sensitivity of the tactile sensor unit can be improved as compared with that of the conventional tactile sensor unit. This makes it easier to provide the cantilever beam structures at a high density, and so the performance of the tactile sensor unit can be improved easily. In addition, the number of the cantilever beam structures required to realize a tactile sensor unit having substantially the same level of sensitivity as the conventional tactile sensor unit can be reduced, and so the production cost can be reduced.

The tactile sensor unit according to the present invention excites the resonant vibration of the cantilever beam structure by matching the frequency of the voltage applied to the piezoelectric layer to the resonant frequency of the cantilever beam structure. Therefore, the tactile sensor unit does not need to include the piezoelectric layer, as long as the resonant vibration of the cantilever beam structure is excited without the piezoelectric layer. For example, the resonant vibration of the cantilever beam structure can be excited by vibrating the substrate or the elastomer part from outside. Alternatively, the vibration can be excited through thermal expansion by providing a heater section in the cantilever beam structure instead of the piezoelectric layer.

<Load Calculation Method>

The resonant frequency of the PZT layer 2a varies in accordance with the load applied to the elastomer part 3. In this embodiment, the resonant frequency detection section shown in FIG. 1 detects the resonant frequency of each cantilever beam structure 2, and the load calculation section calculates a normal directional component and a shear directional component of the load applied to the elastomer part 3 based on a detected change ratio of the resonant frequency. As described above, a load calculation method according to the present invention is for calculating a load applied to a coat of a tactile sensor unit which includes a substrate, the coat formed on the substrate, and a cantilever beam structure including a piezoelectric layer. The cantilever beam structure has one end fixed to the substrate and is curved to rise in such a direction that the other end of the cantilever beam structure is farther from the substrate than the one end, and is capable of resonating at a first resonant frequency and a second resonant frequency which is different from the first resonant frequency. The load calculation method includes a change ratio calculation step of calculating a change ratio of the first resonant frequency obtained in accordance with a change in the load and a change ratio of the second resonant frequency obtained in accordance with the change in the load; and a directional component calculation step of calculating a directional component of the load based on the change ratio of the first resonant frequency obtained in accordance with the change in the load and the change ratio of the second resonant frequency obtained in accordance with the change in the load. Hereinafter, the calculation method will be described in detail.

It is now assumed that resonant frequency $f_0$ in a load-free state, where no load is applied to the elastomer, is the reference frequency, and the resonant frequency when a load is applied is resonant frequency f'. The change amount of the resonant frequency from $f_0$ to f' is $\Delta f = f' - f_0$. The change ratio $\Delta f/f_0$ is defined as resonant frequency change ratio fr. As a result of a simulation described later, it has been found that even when the same load is applied, the resonant frequency change ratio fr is different when the resonance is in the primary mode from when the resonance is in the secondary mode. It has also been found that even when the same load is applied, the resonant frequency change ratio fr is different when a normal load is applied to the elastomer part 3 from when a shear load is applied to the elastomer part 3. Also as a result of the simulation, it has been found that the resonant frequency change ratio fr is generally in proportion to the load applied to the elastomer part 3.

Thus, where the resonant frequency change ratio in the primary mode is $fr_1$, the resonant frequency change ratio in the secondary mode is $fr_2$, the normal load is $P_N$, and the shear load is $P_T$, the following expressions hold.

$$fr_1 = a \cdot P_N \quad \text{Expression (1)}$$

$$fr_1 = b \cdot P_T \quad \text{Expression (2)}$$

$$fr_2 = c \cdot P_N \quad \text{Expression (3)}$$

$$fr_2 = d \cdot P_T \quad \text{Expression (4)}$$

The coefficients a through d each represent a resonant frequency change ratio obtained with respect to a unit load. The specific numerical values of the coefficients a through d will be described in the examples later as exemplary values.

The simulation also shows that in the case where a normal load and a shear load are applied in superposition to the elastomer part 3, the resonant frequency change ratio is approximately equal to a sum of the resonant frequency change ratio obtained when the normal load is applied and the resonant frequency change ratio obtained when the shear load is applied. Accordingly, where the resonant frequency change ratio in the primary mode obtained when the normal load $P_N$ and the shear load $P_T$ are applied in superposition is $fr_1(P_N, P_T)$, and the resonant frequency change ratio in the secondary mode obtained when the normal load $P_N$ and the shear load $P_T$ are applied in superposition is $fr_2(P_N, P_T)$, the following expressions approximately hold.

$$fr_1(P_N, P_T) = fr_1(P_N, 0) + fr_1(0, P_T) \quad \text{Expression (5)}$$

$$fr_2(P_N, P_T) = fr_2(P_N, 0) + fr_2(0, P_T) \quad \text{Expression (6)}$$

Accordingly, $$\begin{pmatrix} fr_1 \\ fr_2 \end{pmatrix} = \begin{pmatrix} a & b \\ c & d \end{pmatrix} \begin{pmatrix} P_N \\ P_T \end{pmatrix} \quad \text{[Formula 1]}$$

holds. Where $$\begin{pmatrix} a & b \\ c & d \end{pmatrix} = A, \quad \text{[Formula 2]}$$

Expression (7)

$$\begin{pmatrix} P_N \\ P_T \end{pmatrix} = A^{-1} \begin{pmatrix} fr_1 \\ fr_2 \end{pmatrix} \quad \text{[Formula 3]}$$

holds. Accordingly, based on expression (7), the normal load $P_N$ and the shear load $P_T$ can be calculated with high precision from the resonant frequency change ratio $fr_1$ in the primary mode and the resonant frequency change ratio $fr_2$ in the secondary mode.

In the above, the load calculation method according to the present invention has been described. The conventional technologies require two cantilever beam structures to sense a normal load and a shear load. In this embodiment, components of the load in a plurality of directions can be sensed separately with a single cantilever beam structure. This provides an effect of realizing a load calculation method by which a slip as well as a pressure can be easily sensed. According to this embodiment, components of the load in a plurality of directions (normal directional component and the shear directional component of the load) can be sensed separately with a single cantilever beam structure. Therefore, when the tactile sensor unit includes a plurality of cantilever beam structures at the same density as the conventional tactile sensor unit, the sensitivity of the tactile sensor unit can be improved as compared with that of the conventional tactile sensor unit. This makes it easier to provide the cantilever beam structures at a high density, and so the performance of the tactile sensor unit can be improved easily. In addition, the number of the cantilever beam structures required to realize a tactile sensor unit of substantially the same level of sensitivity as the conventional tactile sensor unit can be reduced, and so the production cost can be reduced.

With the load calculation method according to the present invention, the reference frequency may be any resonant frequency other than the resonant frequency in the load-free state, where no load is applied to the coat (resonant frequency $f_0$), as long as the change ratio of the first resonant frequency and the change ratio of the second resonant frequency obtained in accordance with the change in the load applied to the coat (elastomer part) can be calculated. A resonant frequency $f_{Nb}$ and a resonant frequency $f_{Tb}$ obtained when a predetermined load is applied (when the reference load $P_{Nb}$ in the normal direction ≠0, when the reference load $P_{Tb}$ in the shear direction ≠0) may be the reference frequency. In more detail, the predetermined load (the reference load) includes the reference load $P_{Nb}$ in the normal direction and the reference load $P_{Tb}$ in the shear direction. In the case where the reference frequency is the frequency $f_{Nb}$ and the frequency $f_{Tb}$, in formulas 1 and 3, $P_N$ is $P_N-P_{Nb}$ and $P_T$ is $P_T-P_{Tb}$. Namely, the "change in the actual resonant frequency from the reference frequency" is in proportion to the "change in the actual load from the reference load".

Regarding the detection of the resonant frequency, the change in the resonant frequency may be sensed as a change in the impedance of the piezoelectric layer. Therefore, in this embodiment, the resonant frequency detection section 52 may detect the resonant frequency from the impedance of the PZT layer 2a.

<Correction Processing>

A method for correcting the value of the load calculated by the load calculation method according to the present invention will be described. According to the correction processing, a directional component of the load is corrected based on a correction value found in advance. In matrix A (Formula 2), the load is calculated using data at four points on the axis. In actuality, the value of matrix A should not be constant but should vary in accordance with the normal load $P_N$ and the shear load $P_T$. The calculation precision is improved without fail by taking data used for the calculation at smaller intervals and performing interpolation on such data. However, from the practical point of view, it is more preferable as the amount of data on the reference load to be referred to for the calculation is smaller. Therefore, eight points in the full scale of the range of load measurement are used for the calculation. In addition, the calculation area is divided into four quadrants in accordance with whether the normal load $P_N$ is positive or negative and in accordance with whether the shear load $P_T$ is positive or negative, and linear reverse calculation is performed in one of the quadrants using end-point data on the axis. Furthermore, the error on the result of the linear reverse calculation obtained at a point, in the quadrant, at which the absolute value of the normal load $P_N$ and the absolute value of the shear load $P_T$ are maximum (corner point) is corrected in accordance with the distance of the corner point from the axis. Hereinafter, the correction processing will be described in detail. In the following description, among the eight points in the full scale, namely, the four points on the axis and the four corner points, the four points on the axis are (−t, 0), (0, t), (t, 0), (0, −t), and the four corner points are (−t −t), (−t, t), (t, t), (t, −t).

Procedure 1: First estimated loads ($P_1 = A^{-1}F$) are calculated. Here, F represents a measured change ratio of the frequency. The first estimated loads $P_1$ are used only to determine the quadrant to which the load belongs (whether each of the normal load $P_N$ and the shear load $P_T$ is positive or negative). Once the quadrant to which the load belongs is found, the calculation and the correction are performed only in that quadrant.

Procedure 2: The code of the first estimated load $P_{1N}$ of the normal load and the code of the first estimated load $P_{1T}$ of the shear load are respectively set as $S_N(=-1(P_{1N}<0), 1(P_{1N}\geq 0))$ and $S_T(=-1(P_{1T}<0), 1(P_{1T}\geq 0))$. $S_N$ and $S_T$ are introduced only to provide a general description which can be adopted regardless of which quadrant, among the four quadrants, is the target of the calculation and the correction.

Procedure 3: Matrix $A_1$ is defined.

$$A_1 = \begin{bmatrix} \dfrac{S_N f_{r1}(tS_N, 0)}{t} & \dfrac{S_T f_{r1}(0, tS_T)}{t} \\ \dfrac{S_N f_{r2}(tS_N, 0)}{t} & \dfrac{S_T f_{r2}(0, tS_T)}{t} \end{bmatrix} \quad \text{[Formula 4]}$$

Matrix $A_1$ is a matrix for linear estimation and is provided based on the data at an end point on the axis in the target quadrant.

Procedure 4: Calculated values at the corner point $p_N(=A_1^{-1}(f_{r1}(tS_N, tS_T))$ and $p_T(=A_1^{-1}(f_{r2}(tS_N, tS_T))$, and calculation errors $e_N(=p_N-tS_N)$ and $e_T(=p_T-tS_T)$, are found in advance. It is known that in the linear reverse estimation using matrix $A_1$ (Procedure 5), an error is made at a point far from the axis. Therefore, such an error is found in advance in Procedure 4. Namely, "calculated values $p_N$ and $p_T$ respectively include calculation errors $e_N$ and $e_T$".

Procedure 5: Linear reverse estimation is performed from the measured values based on matrix $A_1$ to calculate second estimated loads ($P_2 = A_1^{-1}F$).

Procedure 6: The second estimated loads are found based on the calculation errors at the corner point. Here, coefficient c is used in order to correct $P_2$, and needs to fulfill the condition of "increasing as being farther away from 0 on the axis and being 1 at the calculated values $p_N$ and $p_T$ at the point on the axis at which the absolute values are maximum".

$$c = \left| \dfrac{P_{2N} P_{2T}}{p_N p_T} \right| \quad \text{[Formula 5]}$$

$P_{2N}$ represents the second estimated load for the normal load, and $P_{2T}$ represents the second estimated load for the shear load.

Procedure 7: The calculation errors on the second estimated loads are corrected using the correction coefficient to calculate third estimated loads $P_3$.

$$P_3 = P_2 - c \begin{bmatrix} e_N \\ e_T \end{bmatrix} \quad \text{[Formula 6]}$$

$$\begin{bmatrix} e_N \\ e_T \end{bmatrix} = \begin{bmatrix} p_N \\ p_T \end{bmatrix} - \begin{bmatrix} tS_N \\ tS_T \end{bmatrix}$$

The third estimated loads are set as the final calculation results. This means that the data at the eight points in the full scale, namely, the data at the four points on the axis ((−t, 0), (0, t), (t, 0), (0, −t)), and the data at the four corner points at which the absolute value of the normal load and the absolute value of the shear load are both maximum ((−t −t), (−t, t), (t, t), (t, −t)) can be estimated to be the reference load data.

The correction processing according to the present invention is performed as follows. The calculation area is divided into a plurality of quadrants based on whether the normal load and the shear load, among the loads applied to the coat, are each positive or negative. The errors on the loads at a point, among points of each of the plurality of quadrants, where the absolute value of the normal load and the absolute value of the shear value are both maximum are corrected. As a result, the errors calculated based on matrix A, which is not varied in accordance with the normal load or the shear load, can be corrected using data on the load at the corner point. In addition, the amount of data on the reference load to be referred to for the calculation can be reduced, and also the reliability of the result provided by the load calculation method can be improved.

<Robot>

By providing the tactile sensor unit 1 in this embodiment in, for example, a caring robot, a caring robot capable of sensing a pressure and a slip at high precision can be realized. In this case, the cantilever beam structures 2, the elastomer part 3 and the substrate 4 in the tactile sensor unit 1 are provided in a portion of the caring robot which is contactable with a person to be cared.

The present invention is not limited to the above-described embodiment, and may be modified in various manners within the scope of the claims. In other words, embodiments provided by any combination of technological means appropriately modified within the scope of the claims are also encompassed in the technological scope of the present invention.

EXAMPLES

In order to confirm that a normal load and a shear load applied to the elastomer 3 can be separately calculated by the tactile sensor unit 1 described above, a simulation was carried out using the tactile sensor unit 1 shown in FIG. 2.

As shown in FIG. 2, in the tactile sensor unit 1, the fixed end of the cantilever beam structure 2 is located at the position of 2000 μm below a surface of the elastomer part 3. The cantilever beam structure 2 has a length of 200 μm, and is formed to have an arcked outer circumferential surface having an interior angle of 90 degrees. While the cantilever beam structure 2 was resonating in each of the primary mode and the secondary mode, normal loads (−9 kPa, −6 kPa, −3 kPa, 0 kPa, 3 kPa, 6 kPa, 9 kPa) and shear loads (−9 kPa, −6 kPa, −3 kPa, 0 kPa, 3 kPa, 6 kPa, 9 kPa) were applied to the elastomer part 3. The resonant frequency obtained in each case is shown in Table 1.

TABLE 1

| Normal load PN [kPa] | −9 | −6 | −3 | 0 | 3 | 6 | 9 |
|---|---|---|---|---|---|---|---|
| Primary mode resonant frequency [kHz] | 55.73 | 55.702 | 55.674 | 55.646 | 55.618 | 55.59 | 55.562 |
| Secondary mode resonant frequency [kHz] | 289.82 | 289.624 | 289.427 | 289.23 | 289.033 | 288.836 | 288.641 |

TABLE 1-continued

| Shear load PT [kPa] | −9 | −6 | −3 | 0 | 3 | 6 | 9 |
|---|---|---|---|---|---|---|---|
| Primary mode resonant frequency [kHz] | 55.677 | 55.667 | 55.656 | 55.646 | 55.635 | 55.625 | 55.614 |
| Secondary mode resonant frequency [kHz] | 289.554 | 289.445 | 289.337 | 289.23 | 289.123 | 289.018 | 288.912 |

Figure 5:
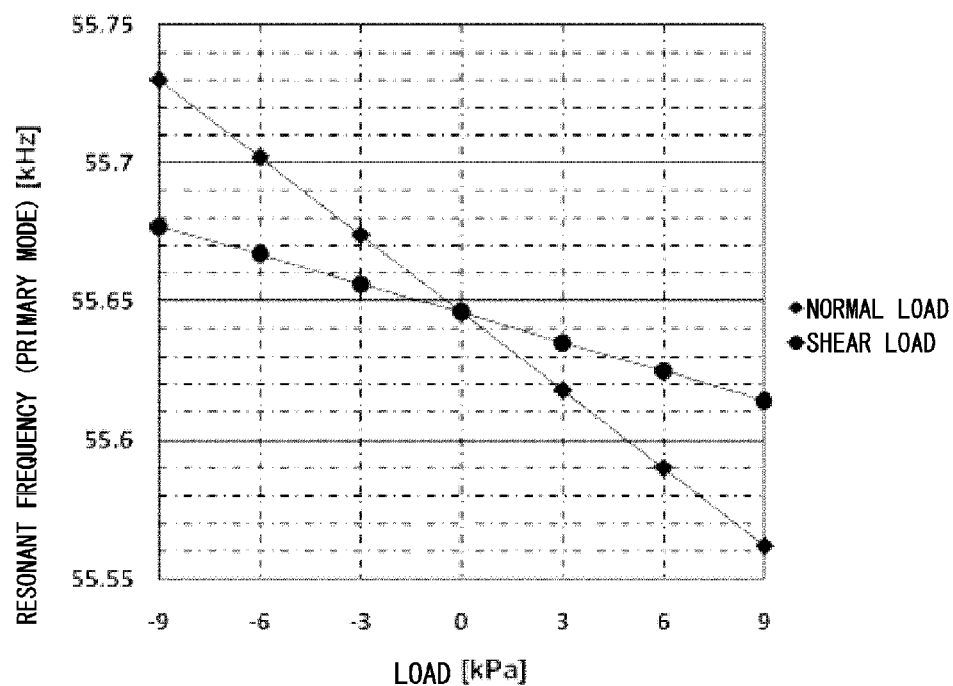
FIG. 5(a) is a graph showing the relationship between the normal load and the resonant frequency and the relationship between the shear load and the resonant frequency in the case where the cantilever beam structure resonates in the primary mode.
FIG. 5(b) is a graph showing the relationship between the normal load and the resonant frequency and the relationship between the shear load and the resonant frequency in the case where the cantilever beam structure resonates in the secondary mode.
Figure 5:
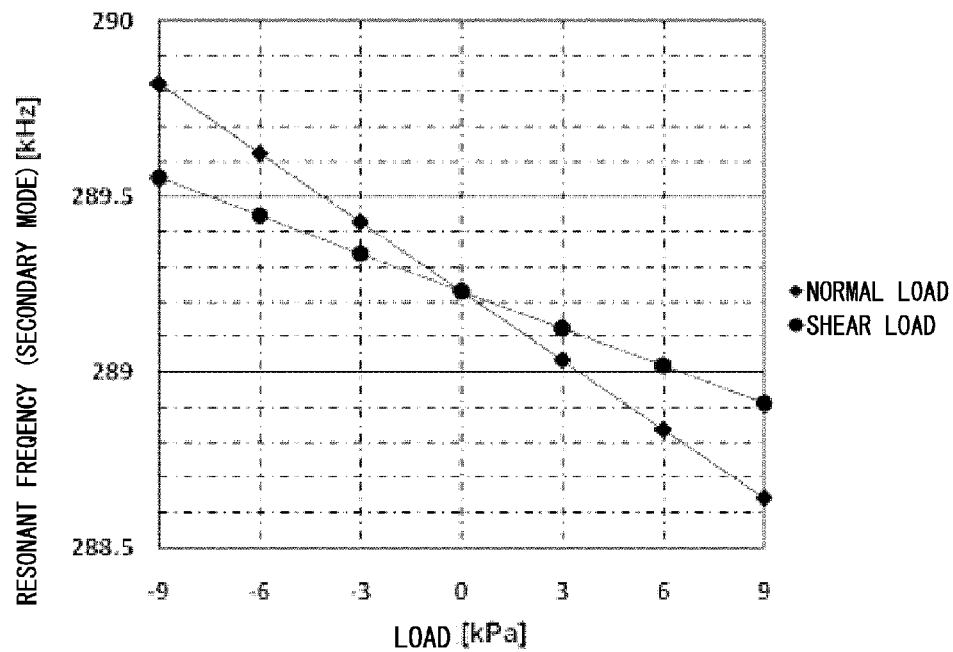

FIG. 5 shows the relationship between the loads and the resonant frequency shown in Table 1 in the form of graphs. FIG. 5(a) is a graph showing the relationship between the normal load and the resonant frequency and the relationship between the shear load and the resonant frequency in the case where the cantilever beam structure 2 resonates in the primary mode. FIG. 5(b) is a graph showing the relationship between the normal load and the resonant frequency and the relationship between the shear load and the resonant frequency in the case where the cantilever beam structure 2 resonates in the secondary mode. It is understood that in all the cases, the load and the resonant frequency are generally in proportion to each other.

Next, in order to confirm that the resonant frequency change ratio obtained when a normal load and a shear load are applied in superposition to the elastomer part 3 is approximately equal to the sum of the resonant frequency change ratio obtained when the normal load is applied and the resonant frequency change ratio obtained when the shear load is applied, a normal load and a shear load were applied in superposition and the resonant frequency in each case was measured. The results are shown in Table 2.

TABLE 2

| | Shear load PT [kPa] | | | | | | |
|---|---|---|---|---|---|---|---|
| Normal load PN [kPa] | −9 | −6 | −3 | 0 | 3 | 6 | 9 |
| (a) Primary mode resonant frequency [kHz] | | | | | | | |
| −9 | 55.761 | 55.751 | 55.74 | 55.73 | 55.72 | 55.709 | 55.698 |
| −6 | 55.733 | 55.723 | 55.712 | 55.702 | 55.692 | 55.681 | 55.67 |
| −3 | 55.705 | 55.695 | 55.684 | 55.674 | 55.663 | 55.653 | 55.642 |
| 0 | 55.677 | 55.667 | 55.656 | 55.646 | 55.635 | 55.625 | 55.614 |
| 3 | 55.649 | 55.639 | 55.628 | 55.618 | 55.607 | 55.597 | 55.586 |
| 6 | 55.621 | 55.611 | 55.6 | 55.59 | 55.579 | 55.568 | 55.558 |
| 9 | 55.593 | 55.582 | 55.572 | 55.562 | 55.551 | 55.54 | 55.53 |
| (b) Secondary mode resonant frequency [kHz] | | | | | | | |
| −9 | 290.131 | 290.028 | 289.924 | 289.821 | 289.718 | 289.616 | 289.517 |
| −6 | 289.938 | 289.833 | 289.728 | 289.624 | 289.519 | 289.416 | 289.314 |
| −3 | 289.746 | 289.638 | 289.532 | 289.427 | 289.321 | 289.218 | 289.114 |
| 0 | 289.554 | 289.445 | 289.337 | 289.23 | 289.123 | 289.018 | 288.912 |
| 3 | 289.361 | 289.25 | 289.141 | 289.033 | 288.925 | 288.817 | 288.712 |
| 6 | 289.169 | 289.056 | 288.947 | 288.836 | 288.727 | 288.618 | 288.51 |
| 9 | 288.977 | 288.864 | 288.751 | 288.641 | 288.529 | 288.42 | 288.311 |

Table 2(a) shows the relationship between the normal load/the shear load and the resonant frequency in the case where the cantilever beam structure 2 resonates in the primary mode. Table 2(b) shows the relationship between the normal load/the shear load and the resonant frequency in the case where the cantilever beam structure 2 resonates in the secondary mode. For example, in Table 2(a), when the normal load $P_N$ of 6 kPa and the shear load $P_T$ of 9 kPa are applied in superposition to the elastomer part 3, the resonant frequency is 55.558 kHz.

Table 3 shows the change amount $\Delta f$ with respect to the resonant frequency in the load-free state.

TABLE 3

| | Shear Load PT [kPa] | | | | | | |
|---|---|---|---|---|---|---|---|
| Normal load PN [kPa] | −9 | −6 | −3 | 0 | 3 | 6 | 9 |
| (a) Change amount of primary mode resonant frequency [kHz] | | | | | | | |
| −9 | 0.115 | 0.105 | 0.094 | 0.084 | 0.074 | 0.063 | 0.052 |
|  | 0.115 | 0.105 | 0.094 |  | 0.073 | 0.063 | 0.052 |
| −6 | 0.087 | 0.077 | 0.066 | 0.056 | 0.046 | 0.035 | 0.024 |
|  | 0.087 | 0.077 | 0.066 |  | 0.045 | 0.035 | 0.024 |

TABLE 3-continued

| Normal load PN [kPa] | Shear Load PT [kPa] | | | | | | |
|---|---|---|---|---|---|---|---|
| | −9 | −6 | −3 | 0 | 3 | 6 | 9 |
| −3 | 0.059 | 0.049 | 0.038 | 0.028 | 0.017 | 0.007 | −0.004 |
| | 0.059 | 0.049 | 0.038 | | 0.017 | 0.007 | −0.004 |
| 0 | 0.031 | 0.021 | 0.01 | 0 | −0.011 | −0.021 | −0.032 |
| 3 | 0.003 | −0.007 | −0.018 | −0.028 | −0.039 | −0.049 | −0.06 |
| | 0.003 | −0.007 | −0.018 | | −0.039 | −0.049 | −0.06 |
| 6 | −0.025 | −0.035 | −0.046 | −0.056 | −0.067 | −0.078 | −0.088 |
| | −0.025 | −0.035 | −0.046 | | −0.067 | −0.078 | −0.088 |
| 9 | −0.025 | −0.035 | −0.046 | −0.056 | −0.067 | −0.078 | −0.088 |
| | −0.025 | −0.035 | −0.046 | | −0.067 | −0.077 | −0.088 |
| (b) Change amount of secondary mode resonant frequency [kHz] | | | | | | | |
| −9 | 0.901 | 0.798 | 0.694 | 0.591 | 0.488 | 0.386 | 0.287 |
| | 0.915 | 0.796 | 0.698 | | 0.484 | 0.379 | 0.273 |
| −6 | 0.708 | 0.603 | 0.498 | 0.394 | 0.289 | 0.186 | 0.084 |
| | 0.718 | 0.609 | 0.501 | | 0.287 | 0.182 | 0.076 |
| −3 | 0.516 | 0.408 | 0.302 | 0.197 | 0.091 | −0.012 | −0.116 |
| | 0.521 | 0.412 | 0.304 | | 0.09 | −0.015 | −0.121 |
| 0 | 0.324 | 0.215 | 0.107 | 0 | −0.107 | −0.212 | −0.318 |
| 3 | 0.131 | 0.02 | −0.089 | −0.197 | −0.305 | −0.413 | −0.518 |
| | 0.127 | 0.018 | −0.09 | | −0.304 | −0.409 | −0.515 |
| 6 | −0.061 | −0.174 | −0.283 | −0.394 | −0.503 | −0.612 | −0.72 |
| | −0.07 | −0.179 | −0.287 | | −0.501 | −0.606 | −0.712 |
| 9 | −0.061 | −0.174 | −0.283 | −0.394 | −0.503 | −0.612 | −0.72 |
| | −0.07 | −0.179 | −0.287 | | −0.501 | −0.606 | −0.712 |

Table 3(a) shows the relationship between the normal load/the shear load and the change amount of the resonant frequency with respect to the load-free state, in the case where the cantilever beam structure 2 resonates in the primary mode. Table 3(b) shows the relationship between the normal load/the shear load and the change amount of the resonant frequency with respect to the load-free state, in the case where the cantilever beam structure 2 resonates in the secondary mode. In Tables 3(a) and 3(b), in each of sections corresponding to the normal loads $P_N$ and the shear loads $P_T$ of −9 kPa, −6 kPa, −3 kPa, 3 kPa, 6 kPa and 9 kPa, the numerical value in the upper row shows the change amount based on the actually measured values (Table 2), and the numerical value in the lower row shows the sum of the change amount obtained when the normal load is applied and the change amount obtained when the shear load is applied.

As is clear from Table 3, in any of the cases where the normal load and the shear load are applied in superposition, the difference between the values in the upper row and the lower row is 0.000 kHz to 0.014 kHz, which is very small. From this, it is understood that the sum of the change amount obtained when a normal load is applied and the change amount obtained when a shear load is applied is approximately equal to the change amount when the normal load and the shear load are applied in superposition. Therefore, expressions (5) and (6) provided above hold.

Next, the applied normal load and the applied shear load were calculated from expression (7) based on the measured resonant frequencies. First, in order to find matrix A in Formula 2, the resonant frequency in each of four patterns of (normal load $P_N$, shear load $P_T$)=(9, 0), (−9, 0), (0, −9), (0, 9) was measured in each of the primary mode and the secondary mode. The results are shown in Table 4.

TABLE 4

| Load (PN, PT) [kPa] | (9, 0) | (−9, 0) | (0, −9) | (0, 9) |
|---|---|---|---|---|
| Primary mode resonant frequency fr1 [kHz] | 55.562 | 55.73 | 55.677 | 55.614 |

TABLE 4-continued

| Load (PN, PT) [kPa] | (9, 0) | (−9, 0) | (0, −9) | (0, 9) |
|---|---|---|---|---|
| Secondary mode resonant frequency fr2 [kHz] | 288.641 | 289.821 | 289.554 | 288.912 |

Based on the above, resonant frequency change ratio a in the primary mode obtained with respect to a unit normal load, resonant frequency change ratio b in the primary mode obtained with respect to a unit shear load, resonant frequency change ratio c in the secondary mode obtained with respect to the unit normal load, and resonant frequency change ratio d in the secondary mode obtained with respect to the unit shear load are obtained as follows by calculating expressions (1) through (4), respectively.

TABLE 5

| Unit [/Pa] | Unit normal load | Unit shear load |
|---|---|---|
| Primary mode | −8.386E−05 | −6.290E−05 |
| Secondary mode | −1.135E−04 | −1.233E−04 |

Based on the above, matrix A in Formula 2 is:

$$A = \begin{pmatrix} -8.386 \times 10^{-5} & -6.290 \times 10^{-5} \\ -1.135 \times 10^{-4} & -1.233 \times 10^{-4} \end{pmatrix} \quad \text{[Formula 7]}$$

Accordingly, by finding reverse matrix of matrix A, i.e., $A^{-1}$, the normal load $P_N$ and the shear load $P_T$ can be calculated based on expression (7). The calculation results are shown in Table 6.

TABLE 6

| Normal load PN [kPa] | | Shear load PT [kPa] | | | | | | |
|---|---|---|---|---|---|---|---|---|
| | | −9 | −6 | −3 | 0 | 3 | 6 | 9 |
| −9 | Normal load | −9.192 | −9.056 | −8.939 | −8.899 | −8.744 | −8.54 | −8.274 |
| | Shear load | −8.388 | −5.747 | −3.055 | −0.206 | 2.383 | 4.857 | 7.167 |
| −6 | Normal load | −6.066 | −6.018 | −5.941 | −5.91 | −5.817 | −5.641 | −5.464 |
| | Shear load | −8.728 | −5.853 | −3.056 | −0.198 | 2.579 | 5.137 | 7.68 |
| −3 | Normal load | −2.931 | −2.938 | −2.936 | −2.931 | −2.875 | −2.706 | −2.59 |
| | Shear load | −9.094 | −6.061 | −3.068 | −0.15 | 2.735 | 5.32 | 8.021 |
| 0 | Normal load | 0.204 | 0.146 | 0.106 | 0 | 0.072 | 0.155 | 0.204 |
| | Shear load | −9.46 | −6.315 | −3.213 | 0 | 2.878 | 5.661 | 8.54 |
| 3 | Normal load | 3.35 | 3.24 | 3.144 | 3.054 | 3.041 | 3.074 | 3.14 |
| | Shear load | −9.847 | −6.527 | −3.281 | −0.075 | 2.982 | 5.932 | 8.758 |
| 6 | Normal load | 6.503 | 6.343 | 6.247 | 6.053 | 6.013 | 6.012 | 5.973 |
| | Shear load | −10.248 | −6.797 | −3.551 | −0.074 | 3.069 | 6.108 | 9.217 |
| 9 | Normal load | 9.669 | 9.489 | 9.256 | 9.101 | 9.001 | 8.971 | 8.893 |
| | Shear load | −10.677 | −7.172 | −3.576 | −0.206 | 3.128 | 6.245 | 9.441 |

In Table 6, the numerical values in the topmost row represent the shear loads $P_T$ actually applied, and the leftmost column represent the normal loads $P_N$ actually applied. In each of the sections showing two numerical values, the upper numerical value represents the calculated value of the normal load, and the lower numerical value represents the calculated value of the shear load. For example, when the normal load of 6 kPa and the shear load of 3 kPa are applied in superposition, the calculated value of the normal load is 6.013 kPa and the calculated value of the shear load is 3.069 kPa.

Figure 6:
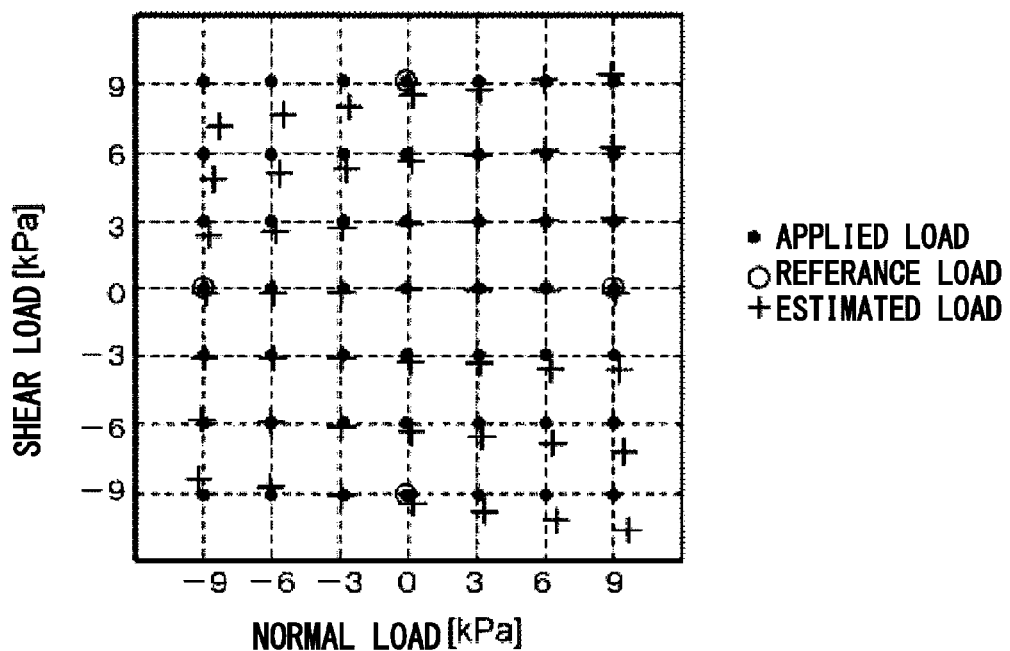
FIG. 6(a) is a graph showing the relationship between the actually applied load and the calculation result before correction processing.
FIG. 6(b) is a graph showing the relationship between the actually applied load and the calculation result after the correction processing.
Figure 6:
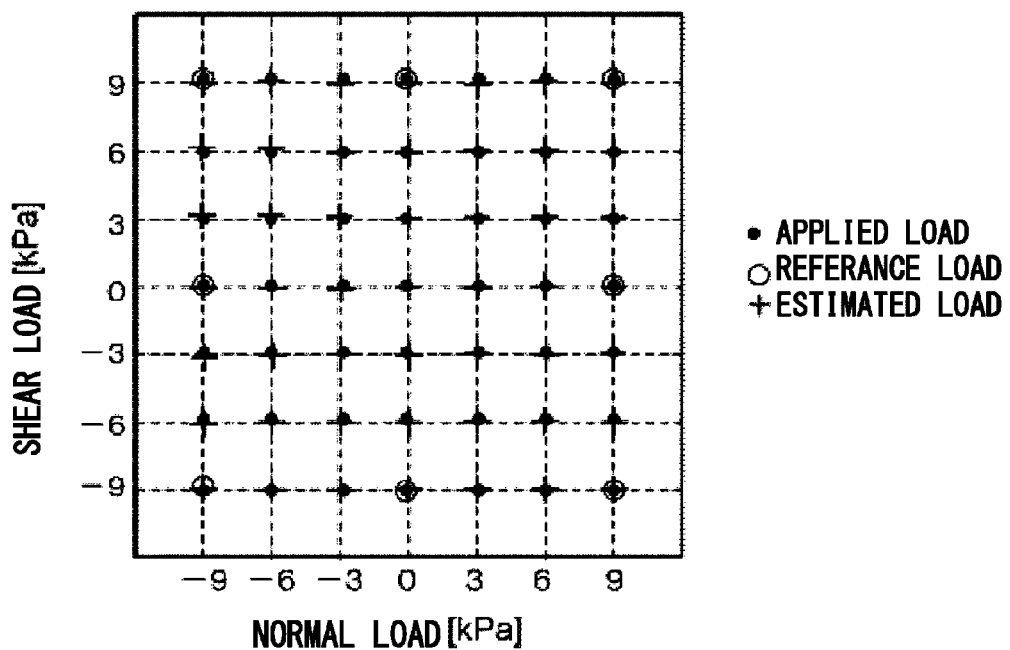
Figure 7:
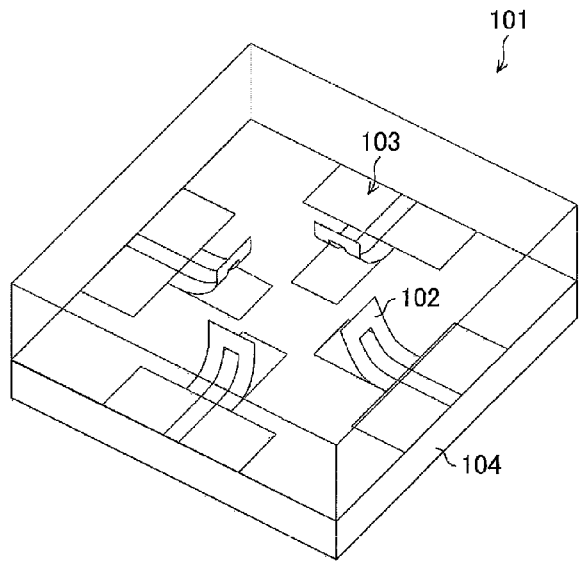
FIG. 7(a) is a perspective view showing a structure of a conventional cantilever type tactile sensor unit.
FIG. 7(b) is a cross-sectional view showing the structure of the conventional cantilever type tactile sensor unit.
Figure 7:
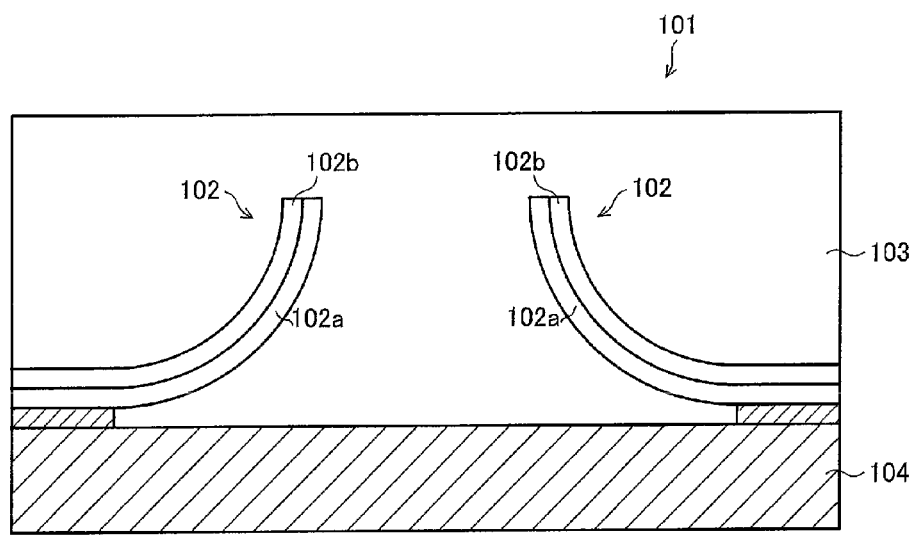
Figure 8:
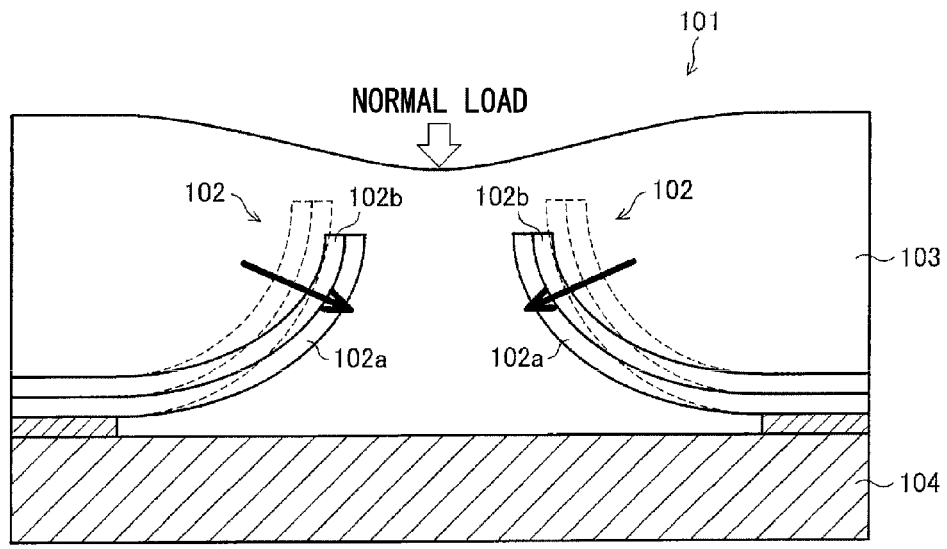
FIG. 8(a) is a cross-sectional view showing a state where a normal load is applied to an elastomer part of the cantilever type tactile sensor unit shown in FIG. 7.
FIG. 8(b) is a cross-sectional view showing a state where a shear load is applied to the elastomer part.
Figure 8:
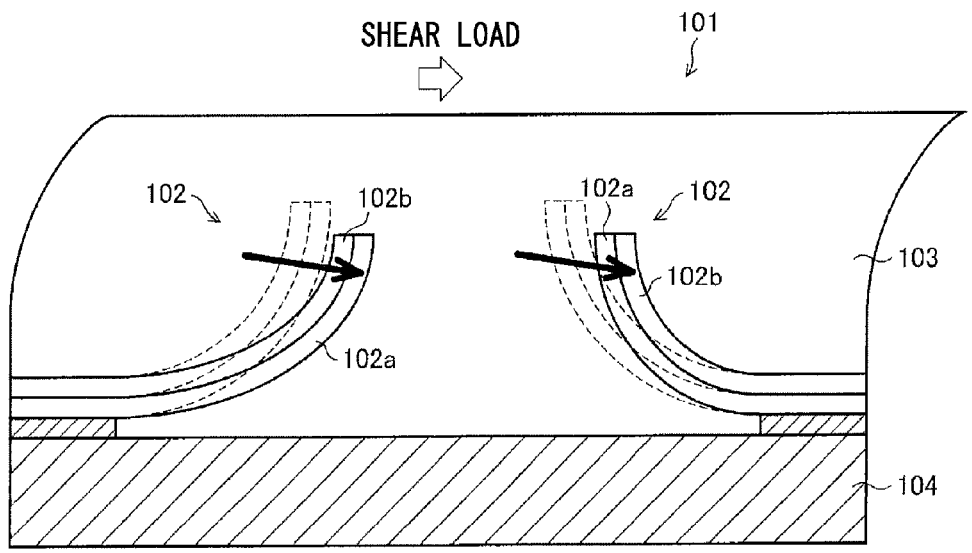

FIG. 6(a) is a graph showing the relationship between the actually applied load and the calculation result before the correction processing. In FIG. 6(a), the actually applied loads are plotted with "●" and the estimated loads obtained by the calculation are plotted with "+". The reference loads referred to for obtaining the calculation expressions are plotted with "○".

It is understood from FIG. 6(a) that even before the correction processing, the actually applied loads generally match the corresponding estimated loads. This has made it possible to confirm that in this embodiment, the normal load and the shear load applied to the elastomer part 3 can be separately calculated by the tactile sensor unit 1.

Table 7 shows the results of the correction processing. The reference load data is data at t=9, namely, data at eight points of (normal load $P_N$, shear load $P_T$)=(−9, −9), (−9, 0), (−9, 9), (0, 9), (9, 9), (9, 0), (9, −9), (0, −9).

In Table 7, the numerical values in the topmost row represent the actually applied shear loads $P_T$, and the numerical values in the leftmost column represent the actually applied normal loads $P_N$. In each of the sections showing two numerical values, the upper numerical value represents the calculated value of the normal load after the correction processing, and the lower numerical value represents the calculated value of the shear load after the correction processing. For example, when the normal load of 6 kPa and the shear load of 3 kPa are applied in superposition, the calculated value of the normal load is 5.970 kPa and the calculated value of the shear load is 3.112 kPa. It is understood from a comparison of Table 6 and Table 7 that the errors on the estimated values at the points far from the axis are significantly decreased. A maximum error in the load vector when the calculation method was used exceeded 15% before the correction processing, but was decreased to about 2.6% by applying the correction processing.

FIG. 6(b) is a graph showing the relationship between the actually applied load and the calculation result after the correction processing. In FIG. 6(b), the actually applied loads are plotted with "●" and the estimated loads obtained by the calculation are plotted with "+". The reference loads referred to for obtaining the calculation expressions are plotted with "○".

It is understood from FIG. 6(b) that the precision of the estimated loads with respect to the actually applied loads was further improved by the correction processing.

TABLE 7

| Normal load PN [kPa] | | Shear load PT [kPa] | | | | | | |
|---|---|---|---|---|---|---|---|---|
| | | −9 | −6 | −3 | 0 | 3 | 6 | 9 |
| −9 | Normal load | −9 | −8.964 | −8.944 | −9 | −9.072 | −9.079 | −9 |
| | Shear load | −9 | −6.08 | −3.119 | 0 | 3.18 | 6.204 | 9 |
| −6 | Normal load | −5.99 | −5.994 | −5.963 | −5.978 | −6.066 | −6.054 | −6.038 |
| | Shear load | −9.025 | −5.995 | −3.057 | −0.057 | 3.18 | 6.16 | 9.111 |
| −3 | Normal load | −2.987 | −2.988 | −2.979 | −2.964 | −3.035 | −2.978 | −2.979 |
| | Shear load | −9.035 | −5.994 | −2.997 | −0.082 | 3.118 | 5.98 | 8.969 |
| 0 | Normal load | 0 | 0.01 | 0.036 | 0 | 0.003 | 0.021 | 0 |
| | Shear load | −9 | −6.007 | −3.055 | 0 | 3.033 | 5.964 | 9 |
| 3 | Normal load | 3 | 2.998 | 3.007 | 3.021 | 2.982 | 2.99 | 3.032 |
| | Shear load | −9.005 | −5.95 | −2.96 | −0.007 | 3.088 | 6.078 | 8.942 |
| 6 | Normal load | 5.998 | 5.99 | 6.033 | 5.987 | 5.97 | 5.988 | 5.965 |
| | Shear load | −9.001 | −5.934 | −3.042 | 0.061 | 3.112 | 6.07 | 9.106 |
| 9 | Normal load | 9 | 9.013 | 8.976 | 9 | 8.977 | 9.014 | 9 |
| | Shear load | −9 | −5.994 | −2.906 | 0 | 3.097 | 6.004 | 9 |

INDUSTRIAL APPLICABILITY

The present invention is usable for an intelligent tire equipped with a slip sensing function as well as a caring robot or an industrial robot.

REFERENCE SIGNS LIST

1 Tactile sensor unit
2 Cantilever beam structure
2a PZT layer (piezoelectric layer)
2c Au layer (voltage application means)
2d Pt/Ti layer (voltage application means)
3 Elastomer part (resin)
4 Substrate
5 Computation section
51 Voltage application section (voltage application means)
52 Resonance frequency detection section (resonant frequency detection means)
53 Load calculation section (load calculation means)

The invention claimed is:

1. A tactile sensor unit, comprising:
a substrate;
a coat formed on the substrate; and
a cantilever beam structure having one end fixed to the substrate and curved to rise in such a direction that the other end of the cantilever beam structure is farther from the substrate than the one end;
the tactile sensor unit detecting a load applied to the coat; wherein:
the cantilever beam structure is capable of resonating at a first resonant frequency and a second resonant frequency which is different from the first resonant frequency; and
the tactile sensor unit further comprising a computation section for calculating a directional component of the load based on a change ratio of the first resonant frequency obtained in accordance with a change in the load and a change ratio of the second resonant frequency obtained in accordance with the change in the load;
the first resonant frequency is a frequency in a first resonance mode;
the second resonant frequency is a frequency in a second resonance mode which is different from the first resonance mode; and
the computation means includes:
voltage application means for applying AC voltages of a plurality of different frequencies to a piezoelectric layer included in the cantilever beam structure to resonate the cantilever beam structure in the first resonance mode and the second resonance mode;
resonant frequency detection means for detecting the first resonant frequency and the second resonant frequency; and
load calculation means for, where a load-free state is a state in which no load is applied to the coat, calculating a directional component of the load in a direction normal to the coat and another directional component of the load in a shear direction based on a first change ratio with respect to the load-free state, which is a change ratio of the first resonant frequency obtained in accordance with the change in the load, and also based on a second change ratio with respect to the load-free state, which is a change ratio of the second resonant frequency obtained in accordance with the change in the load.

2. A tactile sensor unit according to claim 1, wherein:
the voltage application means applies an AC voltage of a still different frequency to the piezoelectric layer to further resonate the cantilever beam structure in a third resonance mode;
the resonant frequency detection means further detects a third resonant frequency, which is a frequency in the third resonance mode, of the cantilever beam structure; and
the load calculation means calculates a directional component of the load in the direction normal to the coat and directional components of the load in two shear directions based on a third change ratio with respect to the load-free state, which is a change ratio of the third resonant frequency obtained in accordance with the change in the load, the components of the load in the two shear directions being perpendicular to each other.

3. A tactile sensor unit according to any one of claims 1 or 2, wherein:
the cantilever beam structure is asymmetric with respect to each of the directional components of the load; and
the cantilever beam structure includes a plurality of electrodes insulated from each other.

4. A robot including a tactile sensor unit according to claim 1,
wherein the substrate, the coat and the cantilever beam structure are provided in a portion of the robot which is contactable with an object which is to contact the robot.

5. A load calculation method for calculating a load applied to a coat of a tactile sensor unit which includes a substrate, the coat formed on the substrate, a computation section, and a cantilever beam structure;
wherein the cantilever beam structure has one end fixed to the substrate and is curved to rise in such a direction that the other end of the cantilever beam structure is farther from the substrate than the one end, and is capable of resonating at a first resonant frequency and a second resonant frequency which is different from the first resonant frequency;
the load calculation method performed in the computation section comprising:
a change ratio calculation step of calculating a change ratio of the first resonant frequency obtained in accordance with a change in the load and a change ratio of the second resonant frequency obtained in accordance with the change in the load;
a directional component calculation step of calculating a directional component of the load based on the change ratio of the first resonant frequency obtained in accordance with the change in the load and the change ratio of the second resonant frequency obtained in accordance with the change in the load;
a step of dividing a calculation area into a plurality of quadrants in accordance with whether a normal load and a shear load, among the loads applied to the coat, are each positive or negative; and
a correction step of correcting an error on each of the loads at a point, among points in each of the plurality of quadrants, at which an absolute value of the normal load and an absolute value of the shear load are both maximum.

* * * * *